US012130735B2

(12) United States Patent
Fang et al.

(10) Patent No.: US 12,130,735 B2
(45) Date of Patent: Oct. 29, 2024

(54) DATA WRITING METHOD AND APPARATUS FOR FLASH MEMORY-BASED SYSTEM

(71) Applicant: HUAWEI TECHNOLOGIES CO., LTD., Guangdong (CN)

(72) Inventors: Wei Fang, Hangzhou (CN); Xie Miao, Hangzhou (CN); Tao Hou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 18/147,362

(22) Filed: Dec. 28, 2022

(65) Prior Publication Data

US 2023/0153236 A1 May 18, 2023

Related U.S. Application Data

(63) Continuation of application No. PCT/CN2021/082231, filed on Mar. 23, 2021.

(30) Foreign Application Priority Data

Jun. 30, 2020 (CN) .......................... 202010614233.6

(51) Int. Cl.
*G06F 12/02* (2006.01)
*G06F 13/16* (2006.01)

(52) U.S. Cl.
CPC ...... *G06F 12/0246* (2013.01); *G06F 12/0253* (2013.01); *G06F 13/1668* (2013.01); *G06F 2212/7201* (2013.01)

(58) Field of Classification Search
CPC ............ G06F 12/0246; G06F 12/0253; G06F 13/1668; G06F 2212/7201; G06F 3/0608;
(Continued)

(56) References Cited

U.S. PATENT DOCUMENTS

2013/0238833 A1* 9/2013 Vogan ................ G06F 12/0246
711/E12.008
2015/0205717 A1 7/2015 Lin et al.
(Continued)

FOREIGN PATENT DOCUMENTS

CN 101075211 A 11/2007
CN 103176916 A 6/2013
(Continued)

OTHER PUBLICATIONS

Extended European Search Report in European Appln No. 21833946. 3, dated Dec. 6, 2023, 11 pages.

*Primary Examiner* — Tasnima Matin
(74) *Attorney, Agent, or Firm* — Fish & Richardson P.C.

(57) ABSTRACT

Data writing methods and computing devices are provided. An example data writing method is applied to a computer system, and the computer system includes a file system and a flash memory-based storage system. The example data writing method includes obtaining a target logical address, where the target logical address is an address allocated from a first logical block to target data to be written into the flash memory-based storage system, the first logical block is one of multiple logical blocks in the file system, and the flash memory-based storage system includes multiple physical blocks. It is determined that the target logical address belongs to the first logical block. The target data is written into a first physical block based on a correspondence between the first logical block and the first physical block, where the first physical block is one of the multiple physical blocks.

20 Claims, 11 Drawing Sheets

(58) Field of Classification Search
CPC ...... G06F 3/064; G06F 3/0652; G06F 3/0679; G06F 16/1727; G06F 16/1847; G06F 2212/1008; G06F 2212/1016; G06F 2212/7205; G06F 2212/7206; G06F 12/0238

See application file for complete search history.

(56) References Cited

U.S. PATENT DOCUMENTS

| | | | |
|---|---|---|---|
| 2020/0110537 A1* | 4/2020 | Hahn | .................. G06F 3/061 |
| 2020/0159656 A1* | 5/2020 | Kim | .................. G06F 12/10 |

FOREIGN PATENT DOCUMENTS

| | | |
|---|---|---|
| CN | 103425600 A | 12/2013 |
| CN | 106326132 A | 1/2017 |
| CN | 106326134 A | 1/2017 |
| CN | 110032531 A | 7/2019 |

* cited by examiner

DATA WRITING METHOD AND APPARATUS FOR FLASH MEMORY-BASED SYSTEM

CROSS-REFERENCE TO RELATED APPLICATIONS

This application is a continuation of International Application No. PCT/CN2021/082231, filed on Mar. 23, 2021, which claims priority to Chinese Patent Application No. 202010614233.6, filed on Jun. 30, 2020. The disclosures of the aforementioned applications are hereby incorporated by reference in their entireties.

TECHNICAL FIELD

This application relates to the field of storage management technologies, and in particular, to a data writing method and apparatus.

BACKGROUND

Flash memory (flash) chip-based storage devices, for example, a solid-state disk (solid-state disk, SSD), a universal flash storage (universal flash storage, UFS), and an embedded multi-media card (embedded multi-media card, eMMC), are widely used in various fields of information and communication technology (information and communication technology, ICT). The flash memory chip-based storage devices have a flash translation layer (flash translation layer, FTL). The FTL shields a feature of sequential writing of a flash memory. Therefore, the storage devices may be presented to a host side as common block devices, so that file systems based on a block device may be used on the storage devices.

A flash-friendly file system (flash-friendly file system, F2FS) is a file system based on a block device. The F2FS allocates a logical address (logical address, LA) from a logical block (logical block, LB) to data to be written into the storage device. Logical addresses allocated by the F2FS are random. However, due to the feature of sequential writing of the flash memory chip in the storage device, regardless of which logical block the logical address allocated by the F2FS is located in, the storage device sequentially allocates a physical address (physical address, PA) from a physical block (physical block, PB), writes the data into a physical page corresponding to the physical address, and establishes a mapping relationship between the physical address of the data and the logical address. Therefore, when the data needs to be read, the mapped physical address can be found through the logical address, to read the data.

Some of the data written into the physical block may not be used, and the data becomes invalid. To reclaim storage space, the invalid data needs to be deleted by using a garbage collection (garbage collection, GC) mechanism, and valid data is collected, to obtain continuous storage space. Because the flash memory chip has a feature that the entire physical block needs to be erased before being written again, valid data, on which GC is performed, on the physical block needs to be migrated to another physical block during GC, to obtain a clean physical block. Because the logical address and the physical address that are allocated by the F2FS are randomly mapped, data mapped to two continuous logical addresses in one logical block is distributed in different physical blocks, or logical addresses mapped to two continuous physical addresses in one physical block are distributed in different logical blocks. In this case, during GC, the F2FS and the storage device need to obtain, according to respective GC mechanisms of the F2FS and the storage device, continuous logical addresses, and obtain a clean physical block. However, when performing GC, the F2FS performs a data write operation. Consequently, a plurality of pieces of data that may have been stored in one physical block of the storage device are distributed to different physical blocks, resulting in fragmentation of the storage space of the storage device.

SUMMARY

Embodiments of this application provide a data writing method, to ensure that only garbage collection (garbage collection, GC) of a file system is performed, to obtain continuous logical addresses in the file system and a clean physical block in a storage system, and to some extent, avoid fragmentation of the storage system caused by a process of performing GC of the file system. Embodiments of this application further provide a corresponding apparatus and system.

According to a first aspect, this application provides a data writing method. The method is applied to a computer system, and the computer system includes a file system and a flash memory-based storage system. The method includes: obtaining a target logical address, where the target logical address is an address allocated from a first logical block to target data to be written into the storage system, the first logical block is one of a plurality of logical blocks included in the file system, and the storage system includes a plurality of physical blocks; determining that the target logical address belongs to the first logical block; and writing the target data into a first physical block based on a correspondence between the first logical block and the first physical block, where the first physical block is one of the plurality of physical blocks.

In the first aspect, the computer system may be a server, a terminal device, or a virtual machine (virtual machine, VM). The file system may be a flash-friendly file system (flash-friendly file system, F2FS). The flash memory-based storage system may be a flash memory (flash) chip-based storage device. In this application, a process in the first aspect may be performed by a processor in the storage system, and the computer system may further include another processor. If the storage system does not include a processor, the process may be performed by a processor, for example, a central processing unit CPU, in the computer system.

In this application, one flash memory chip may be understood as one physical block (physical block, PB), and each physical block includes a plurality of physical pages (physical page, PP). A logical block (logical block, LB) is a logical concept and corresponds to a physical block. Each logical block includes a plurality of logical pages (logical page, LP), and a quantity of logical pages corresponds to a quantity of physical pages of the physical block. Each logical page has a logical address (logical address, LA), and each physical page has a physical address (physical address, PA). Because the flash memory chip can be written only after the entire block is erased, the logical block may also be referred to as a logical erase block (logical erase block, LEB), and the physical block may also be referred to as a physical erase block (physical erase block, PEB). The first logical block corresponds to the first physical block. This can ensure that data located at a logical address allocated from the first logical block can be written into the first physical block. In this way, when GC is performed on the first logical block in the file system, data that is stored in the first physical block is triggered to be read and written into another physical block, and the data of the first physical block is migrated to the another physical block along with the GC process of the first logical block in the file system, to obtain continuous logical space in the first logical block and a clean first physical block. Therefore, according to the method provided in this application, a logical block and a physical block can be simultaneously managed only by performing GC of the file system. GC of the storage system is not required, and fragmentation of storage space of the storage system caused by performing GC of the file system is further avoided.

In a possible implementation of the first aspect, before the obtaining a target logical address, the method further includes: reading the target data from a second physical block in response to a read request for the target data, where the read operation is triggered by a garbage collection GC process of the file system.

In this possible implementation, the target data is stored in the second physical block before being written into the first physical block, and a second logical block corresponds to the second physical block. When GC of the file system is performed, a read operation on the target data is first triggered, that is, the target data is read from the second physical block. This can ensure that when GC is performed on the second logical block, data of the second physical block may be migrated to the first physical block along with a process of migrating logical data of the second logical block to the first logical block. GC of the storage system is not required, and fragmentation of storage space of the storage system caused by performing GC of the file system is further avoided.

In a possible implementation of the first aspect, the determining that the target logical address belongs to the first logical block includes: determining that the target logical address indicates a first logical page of the first logical block, applying for or allocating the first physical block, and establishing the correspondence between the first logical block and the first physical block. Correspondingly, the writing the target data into a first physical block based on a correspondence between the first logical block and the first physical block includes: writing the target data into the first physical page of the first physical block based on the correspondence.

In this possible implementation, the correspondence between the first logical block and the first physical block may be established when it is determined that the target logical address is the "first" ("the first" herein is different from "a first", "a second", or the like in the claims, and "the first" indicates a sequence) logical address of the first logical block, to maintain the correspondence between the first logical block and the first physical block. When there is a logical address belonging to the first logical block subsequently, corresponding data is written into the first physical block. Because the flash memory chip has a feature of sequential writing, the target data is usually written into the first physical page. The correspondence between the first logical block and the first physical block is established only when it is determined that the target logical address is a first logical address of the first logical block. This can improve flexibility of a correspondence between a logical block and a physical block, and help improve flexibility of physical block management.

In a possible implementation of the first aspect, the method further includes: establishing a correspondence between a first logical segment of the first logical block and a first physical segment of the first physical block, where the first logical segment includes at least two logical pages, the first physical segment includes at least two physical pages, and the target logical address indicates one logical page of the first logical segment. Correspondingly, the writing the target data into a first physical block based on a correspondence between the first logical block and the first physical block includes: writing the target data into one physical page of the first physical segment based on the correspondence between the first logical segment and the first physical segment.

In this possible implementation, a concept of "segment (segment)" is provided, and a length of a "segment" is between a length of a "block (block)" and a length of a "page (page)". A segment of a physical block is referred to as a physical segment (physical segment), and a segment of a logical block is referred to as a logical segment (logical segment). One physical block usually includes a plurality of physical segments, and one physical segment usually includes a plurality of physical pages. Correspondingly, one logical block usually includes a plurality of logical segments, and one logical segment includes a plurality of logical pages. When a logical block corresponds to a physical block, a quantity of logical segments is equal to a quantity of physical segments. When a logical segment corresponds to a physical segment, a quantity of logical pages is equal to a quantity of physical pages. For example, if the first logical block has six logical segments, and each logical segment has 10 logical pages, the first physical block has six physical segments, and each physical segment has 10 physical pages. Compared with the page mapping manner, the segment mapping manner can reduce a size of a mapping table, and facilitate fast data reading.

In a possible implementation of the first aspect, the writing the target data into one physical page of the first physical segment based on the correspondence between the first logical segment and the first physical segment includes: determining, based on an offset of the target logical address in the first logical segment, a target physical page corresponding to the offset in the first physical segment, and writing the target data into the target physical page.

In this possible implementation, a mapped physical segment may be quickly found from the mapping table with a small size in the segment mapping manner, and then a target physical page only needs to be determined based on an offset. This can quickly determine the target physical page, and improve a data writing speed.

In a possible implementation of the first aspect, the method further includes: obtaining mode information, where the mode information is determined based on an attribute of the target data, and if the attribute indicates that the target data is key data, the mode information indicates that the first logical block is in a first mode, or if the attribute indicates that the target data is non-key data, the mode information indicates that the first logical block is in a second mode; and setting a mode of the first physical block to be the same as a mode of the first logical block based on the mode information, where a speed of reading data from the first physical block in the first mode is greater than a speed of reading data from the first physical block in the second mode.

In this possible implementation, when the first physical block is set to the first mode, some storage space is disabled. Therefore, when no data is written into the first physical block, available space of the first physical block in the first mode is less than available space of the first physical block in the second mode. The first mode may be a single-level cell (single-level cell, SLC), and the second mode may be a multi-level cell (multi-level cell, MLC), a triple-level cell (triple-level cell, TLC), or a quadrilateral-level cell (quadrilateral-level cell, QLC). Alternatively, the first mode may be an MLC, and the second mode may be a TLC or a QLC, or the first mode may be a TLC, and the second mode may be a QLC. Key data is data that meets a preset attribute, for example, data of a frequently used application and a key library file. The key data is written into the physical block in the first mode. This can improve a reading speed of the key data, and further improve smoothness of an application frequently used by a user.

In a possible implementation of the first aspect, the method further includes: if total available storage space of the storage system meets a preset requirement, and the key data is detected in the physical block in the second mode, migrating the key data in the physical block in the second mode to the physical block in the first mode.

In this possible implementation, when remaining storage space is small, the key data may be temporarily written into the physical block in the second mode. After a period of time, the user may clear some historical data, or some invalid data is deleted during GC, and there is sufficient storage space, for example, the storage space exceeds a preset threshold. Whether the physical block in the second mode stores the key data may be detected. If the key data is stored in the physical block in the second mode, the key data may be migrated to the physical block in the first mode in time. This can improve a reading speed of the key data.

According to a second aspect, this application provides a data writing method. The method is applied to a computer system, and the computer system includes a file system, a flash memory-based storage system, and a first processor. The storage system includes a second processor. The method includes: The first processor allocates a target logical address from a first logical block to target data to be written into the storage system. The first logical block is one of a plurality of logical blocks included in the file system, and the storage system includes a plurality of physical blocks. The first processor sends the target logical address to the second processor, where the target logical address is used by the second processor to determine that the target logical address belongs to the first logical block; and writes the target data into a first physical block based on a correspondence between the first logical block and the first physical block, where the first physical block is one of the plurality of physical blocks.

For content related to the first aspect in the second aspect, refer to the descriptions of the first aspect. Details are not described herein again. When receiving a data write request or a data migration request, the first processor allocates the target logical address to the target data, and then notifies the second processor of the target logical address. Therefore, the second processor can write the target data into the first physical block corresponding to the first logical block. The first logical block corresponds to the first physical block. This can ensure that data located at a logical address allocated from the first logical block can be written into the first physical block. In this way, when GC of the file system is performed, logical data, of the first logical block, corresponding to a logical address is migrated to another logical block, where there is a mapping relationship between the logical address and a physical address, data that is stored in the first physical block is triggered to be read and written into another physical block, and the data of the first physical block is migrated to the another physical block along with the GC process of the first logical block in the file system, to obtain continuous logical space in the first logical block and a clean first physical block. It can be learned from the second aspect that a logical block and a physical block can be simultaneously managed only by performing GC of the file system. GC of the storage system is not required, and fragmentation of storage space of the storage system caused by performing GC of the file system is further avoided.

In a possible implementation of the second aspect, before the first processor sends the target logical address to the second processor, the method further includes: The first processor triggers a read request for the target data in a process of performing garbage collection GC of the file system. The read request is used by the second processor to read the target data from a second physical block.

In this possible implementation, the target data is stored in the second physical block before being written into the first physical block, a second logical block corresponds to the second physical block, and the first processor performs GC of the file system. When performing GC on the target data, the first processor first allocates the target logical address to the target data from the first logical block, and then sends both an original logical address and the target logical address to the second processor. The second processor determines, based on the original logical address, that the target data of the second physical block needs to be migrated, determines a storage location of the target data in the first physical block based on the target logical address, and then migrates the target data to the first physical block. In this possible implementation, it can be ensured that when the first processor performs GC on the second logical block, data of the second physical block may be migrated to the first physical block along with a process of migrating logical data of the second logical block to the first logical block. GC of the storage system is not required, and fragmentation of storage space of the storage system caused by performing GC of the file system is further avoided.

In a possible implementation of the second aspect, the method further includes: The first processor determines an attribute of the target data. The first processor determines the first logical block based on the attribute. If the attribute indicates that the target data is key data, the first logical block is in a first mode, or if the attribute indicates that the target data is non-key data, the first logical block is in a second mode. Correspondingly, a mode of the first physical block is the same as a mode of the first logical block, and a speed of reading data from the first physical block in the first mode is greater than a speed of reading data from the first physical block in the second mode.

In this possible implementation, the first processor may determine, based on the attribute of the target data, whether to allocate the target logical address from the logical block in the first mode or from the logical block in the second mode. Because the first logical block corresponds to the first physical block, if the first logical block is in the first mode, the first physical block is also in the first mode, or if the first logical block is in the second mode, the first physical block is also in the second mode. For meanings of the first mode and the second mode, refer to some related content of the first aspect.

In a possible implementation of the second aspect, the method further includes: If the target logical address is the first logical address of the first logical block, the first processor sets the mode of the first logical block based on the attribute of the target data. The first processor sends mode information of the first logical block to the second processor, where the mode information indicates the second processor to set the mode of the first physical block to be the same as the mode of the first logical block.

In this possible implementation, when allocating the first logical address of the first logical block, the first processor sets the mode of the first logical block based on the attribute of the target data, and then notifies the second processor of information about the set mode. The second processor sets the mode of the first physical block based on the mode of the first logical block.

In a possible implementation of the second aspect, that the first processor sets the mode of the first logical block based on the attribute of the target data includes: if the attribute indicates that the target data is key data, setting the mode of the first logical block to the first mode; or if the attribute indicates that the target data is non-key data, setting the mode of the first logical block to the second mode.

In this possible implementation, if the target data is key data, the mode of the first logical block is set to the first mode. If the target data is non-key data, the mode of the first logical block is set to the second mode. This can improve a speed of reading the key data, and improve smoothness of an application frequently used by a user.

According to a third aspect, this application provides a data writing apparatus. The data writing apparatus has a function of implementing the method in any one of the first aspect or the possible implementations of the first aspect. The function may be implemented by hardware, or may be implemented by hardware by executing corresponding software. The hardware or the software includes one or more modules, for example, a receiving unit and a processing unit, corresponding to the function.

According to a fourth aspect, this application provides a data writing apparatus. The data writing apparatus has a function of implementing the method in any one of the second aspect or the possible implementations of the second aspect. The function may be implemented by hardware, or may be implemented by hardware by executing corresponding software. The hardware or the software includes one or more modules, for example, a sending unit and a processing unit, corresponding to the function.

According to a fifth aspect, this application provides a computer device. The computer device includes at least one processor, a storage system, an input/output (input/output, I/O) interface, and computer-executable instructions that are stored in the storage system and that may be run on the processor. When the computer-executable instructions are executed by the processor, the processor performs the method according to any one of the first aspect or the possible implementations of the first aspect.

According to a sixth aspect, this application provides a computer device. The computer device includes at least one processor, a memory, an input/output (input/output, I/O) interface, and computer-executable instructions that are stored in the memory and that may be run on the processor. When the computer-executable instructions are executed by the processor, the processor performs the method according to any one of the second aspect or the possible implementations of the second aspect.

According to a seventh aspect, this application provides a computer-readable storage medium storing one or more computer-executable instructions. When executing the computer-executable instructions, a processor performs the method in any one of the first aspect or the possible implementations of the first aspect.

According to an eighth aspect, this application provides a computer-readable storage medium storing one or more computer-executable instructions. When executing the computer-executable instructions, a processor performs the method in any one of the second aspect or the possible implementations of the second aspect.

According to a ninth aspect, this application provides a computer program product storing one or more computer-executable instructions. When executing the computer-executable instructions, a processor performs the method in any one of the first aspect or the possible implementations of the first aspect.

According to a tenth aspect, this application provides a computer program product storing one or more computer-executable instructions. When executing the computer-executable instructions, a processor performs the method in any one of the second aspect or the possible implementations of the second aspect.

According to an eleventh aspect, this application provides a chip system. The chip system includes at least one processor, and the at least one processor is configured to support a data writing apparatus in implementing the function in any one of the first aspect or the possible implementations of the first aspect. In a possible design, the chip system may further include a memory. The memory is configured to store program instructions and data that are necessary for the data writing apparatus. The chip system may include a chip, or may include a chip and another discrete device.

According to a twelfth aspect, this application provides a chip system. The chip system includes a processor, configured to support a data writing apparatus in implementing the function in any one of the second aspect or the possible implementations of the second aspect. In a possible design, the chip system may further include a memory. The memory is configured to store program instructions and data that are necessary for the data writing apparatus. The chip system may include a chip, or may include a chip and another discrete device.

For technical effects brought by any one of the third aspect, the fifth aspect, the seventh aspect, the ninth aspect, and the eleventh aspect or the possible implementations of the third aspect, the fifth aspect, the seventh aspect, the ninth aspect, and the eleventh aspect, refer to technical effects brought by the first aspect or the possible implementations of the first aspect. Details are not described herein again.

For technical effects brought by any one of the fourth aspect, the sixth aspect, the eighth aspect, the tenth aspect, and the twelfth aspect or the possible implementations of the fourth aspect, the sixth aspect, the eighth aspect, the tenth aspect, and the twelfth aspect, refer to technical effects brought by the second aspect or the possible implementations of the second aspect. Details are not described herein again.

According to the solution provided in embodiments of this application, when data is written, the target logical address is allocated from the first logical block, and the target data is written into the first physical block based on the correspondence between the first logical block and the first physical block. In this way, when GC is performed on the first logical block, data that is stored in the first physical block is triggered to be read and written into another physical block, and the data of the first physical block is migrated to the another physical block along with the GC process of the first logical block, to obtain continuous logical space in the first logical block and a clean first physical block. It can be learned that, according to the solution provided in this application, a logical block and a physical block can be simultaneously managed only by performing GC of the file system. GC of the storage system is not required, and fragmentation of storage space of the storage system caused by performing GC of the file system is further avoided.

DESCRIPTION OF EMBODIMENTS

The following describes embodiments of this application with reference to the accompanying drawings. It is clear that the described embodiments are merely a part rather than all of the embodiments of this application. A person of ordinary skill in the art may learn that as a technology evolves and a new scenario emerges, technical solutions provided in embodiments of this application are also applicable to a similar technical problem.

In the specification, claims, and the accompanying drawings of this application, terms "first", "second", and the like are intended to distinguish similar objects but do not necessarily indicate a specific order or sequence. It should be understood that data termed in such a way is interchangeable in a proper circumstance, so that the embodiments described herein can be implemented in other orders than the order illustrated or described herein. In addition, the terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Embodiments of this application provide a data writing method, to ensure that only garbage collection (garbage collection, GC) of a file system is performed, to obtain continuous logical addresses in the file system and a clean physical block in a storage system, and avoid fragmentation of the storage system caused by a process of performing GC of the file system. Embodiments of this application further provide a corresponding apparatus and system. The following provides descriptions in detail.

The data writing method provided in embodiments of this application is applied to a computer system. The computer system may be a server, a terminal device, or a virtual machine (virtual machine, VM). For an architecture of the computer system, refer to FIG. 1.

Figure 1:
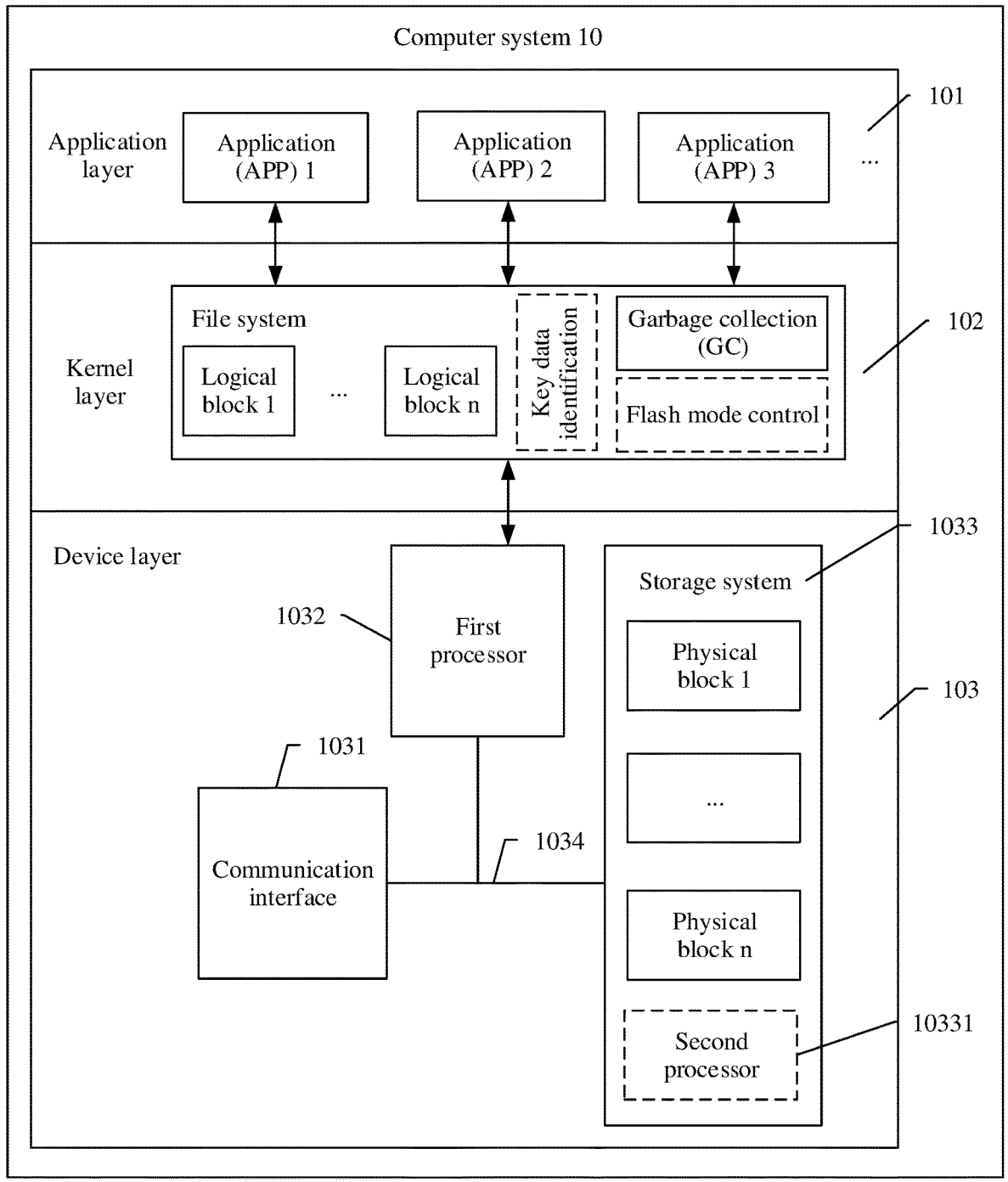
FIG. 1 is a schematic diagram of a structure of a computer system according to an embodiment of this application.

FIG. 1 is a schematic diagram of an architecture of a computer system 10.

As shown in FIG. 1, the architecture of the computer system 10 includes an application layer 101, a kernel layer 102, and a device layer 103.

The application layer 101 includes a plurality of applications (application, APP), for example, an APP 1, an APP 2, and an APP 3 shown in FIG. 1. The APPs may be various types of applications, for example, an instant messaging application, a map application, and a shopping application. It should be noted that the application layer 101 may include a plurality of applications, which are not limited to the three applications shown in FIG. 1.

The kernel layer 102 includes a file system. The file system may be a flash-friendly file system (flash-friendly file system, F2FS). The file system may include a plurality of logical blocks (logical block, LB), for example, a logical block 1, . . . , and a logical block n. Each logical block may include a plurality of logical pages (logical page, LP), and each logical page has one logical address (logical address, LA). The file system further includes a GC file, and the file system may further include a key data identification file and a flash mode control (flash mode control) file.

The device layer 103 includes a communication interface 1031, a first processor 1032, a storage system 1033, a bus 1034, and the like. The communication interface 1031, the first processor 1032, and the storage system 1033 are connected by using the bus 1034. The first processor may include any type of general-purpose computing circuit or special-purpose logic circuit, for example, a field programmable gate array (field programmable gate array, FPGA) or an application-specific integrated circuit (application-specific integrated circuit, ASIC). The first processor may alternatively be one or more processors coupled to one or more semiconductor substrates, such as a central processing unit (central processing unit, CPU). The storage system includes a plurality of flash memory (flash) chips. When data is written, the first processor may write the data to a corresponding flash memory chip by using the bus. Each flash memory chip in the storage system may be understood as one physical block (physical block, PB), and each physical block includes a plurality of physical pages (physical page, PP). Each physical page has a physical address (physical address, PA).

Because the flash memory chip can be written only after the entire block is erased, the logical block may also be referred to as a logical erase block (logical erase block, LEB), and the physical block may also be referred to as a physical erase block (physical erase block, PEB).

After running the GC file, the first processor 1032 may clear invalid data and migrate valid data of the logical block of the file system. The first processor 1032 may perform key data identification after running the key data identification file. After running the flash mode control (flash mode control) file, the first processor 1032 may control a mode of the flash memory chip.

The storage system may further include a second processor 10331. If the storage system includes the second processor 10331, the data writing method provided in embodiments of this application may be completed through cooperation between the first processor and the second processor. If the storage system does not include the second processor, the data writing method provided in embodiments of this application is independently completed by the first processor. The following describes solutions in the two cases with reference to the accompanying drawings.

1. A data writing solution provided in embodiments of this application is completed through cooperation between the first processor and the second processor.

Figure 2:
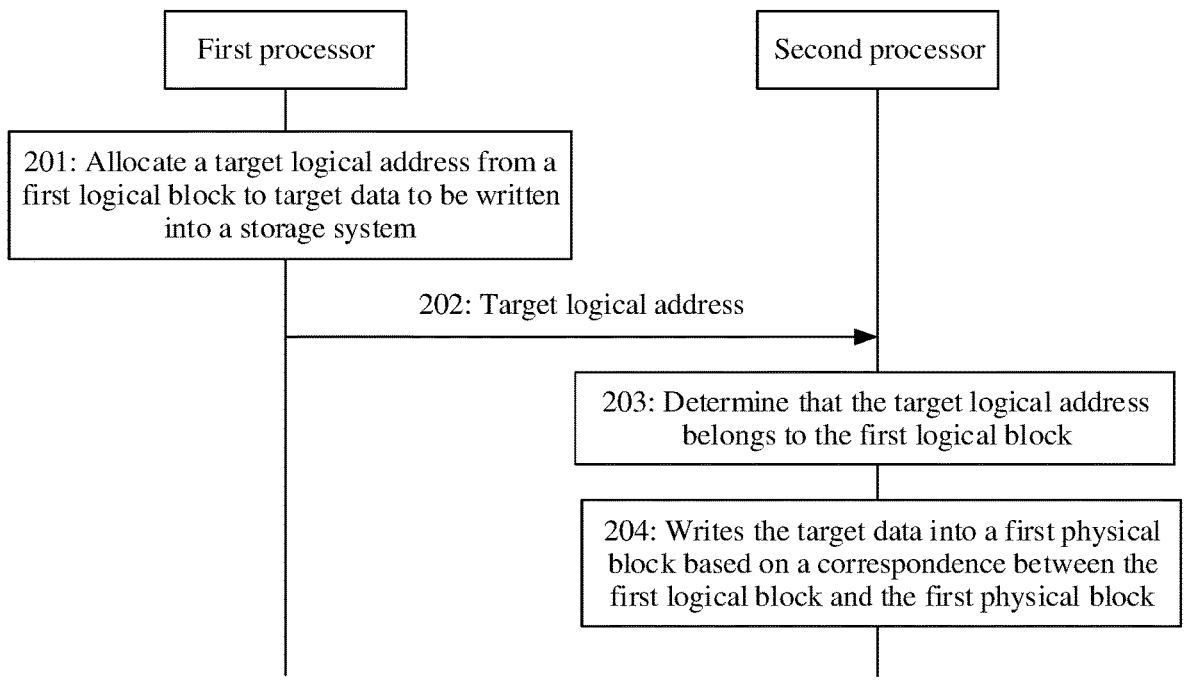
FIG. 2 is a schematic diagram of an embodiment of a data writing method according to an embodiment of this application.

As shown in FIG. 2, an embodiment of a data writing method according to an embodiment of this application includes the following steps.

201: A first processor allocates a target logical address from a first logical block to target data to be written into the storage system.

The first logical block is one of a plurality of logical blocks included in a file system.

The target logical address may be a logical address of a logical page of the first logical block.

202: The first processor sends the target logical address to a second processor, and correspondingly the second processor receives the target logical address sent by the first processor.

203: The second processor determines that the target logical address belongs to the first logical block.

Usually, logical addresses in the file system are continuous, and a quantity of logical pages included in each logical block is also fixed. For example, each logical block includes M logical pages. If the target logical address is expressed as X*M, it may be determined that a target address is located at a logical block whose block number is "X", and the first logical block is a logical block whose block number is "X". It is clear that a quantity of logical pages included in each logical block is not limited to be the same. If the quantity of logical pages is not the same, the target logical address may be represented by accumulating logical addresses of each logical block.

204: The second processor writes the target data into a first physical block based on a correspondence between the first logical block and the first physical block.

The first physical block is one of a plurality of physical blocks included in the storage system.

The correspondence between the first logical block and the first physical block may be pre-established during system initialization, or may be established when the first logical block is used for the first time.

Figure 3A:
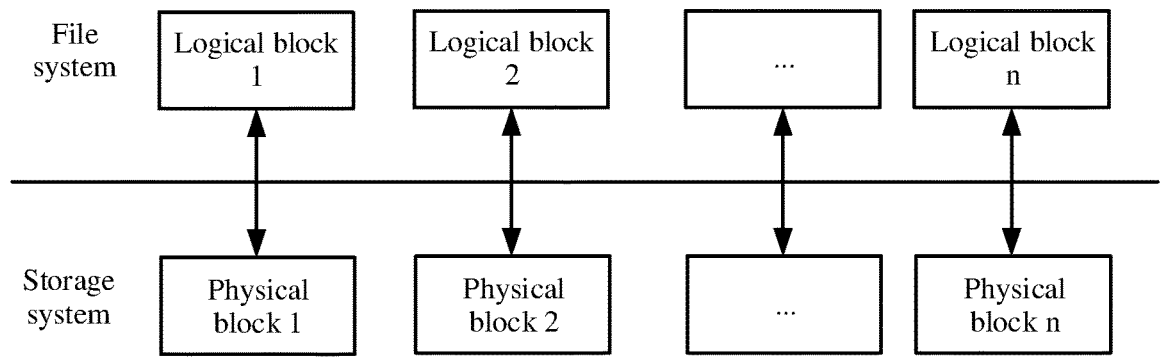
FIG. 3A is a schematic diagram of a correspondence between a logical block and a physical block according to an embodiment of this application.
Figure 3B:
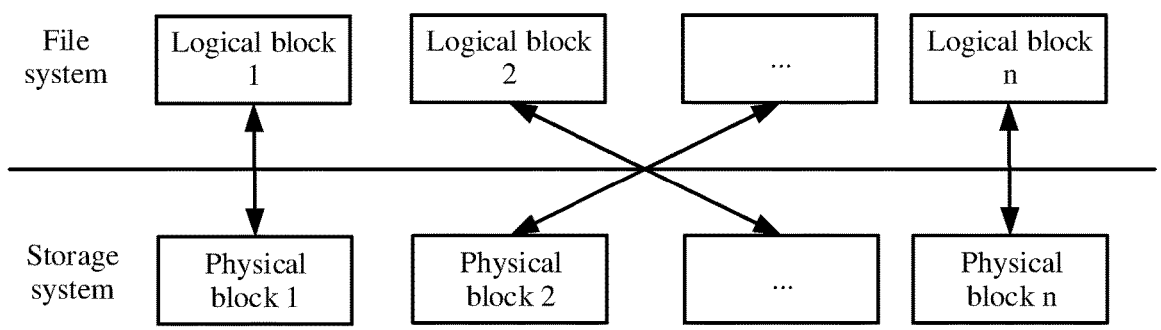
FIG. 3B is a schematic diagram of another correspondence between a logical block and a physical block according to an embodiment of this application.

A correspondence between logical blocks of the file system and physical blocks of the storage system may be logical blocks sequentially allocated by the file system and physical blocks sequentially allocated by the storage system as shown in FIG. 3A. Logical blocks one-to-one correspond to physical blocks in a sequence. The file system may not sequentially allocate the logical blocks, but the storage system sequentially allocates the physical blocks. Therefore, as shown in FIG. 3B, the logical blocks may not sequentially correspond to the physical blocks, provided that the logical blocks one-to-one correspond to the physical blocks. In this embodiment of this application, a correspondence sequence is not limited.

According to the data writing solution provided in this embodiment of this application, the first logical block corresponds to the first physical block. This can ensure that data located at a logical address allocated from the first logical block can be written into the first physical block. In this way, when GC is performed on the first logical block in the file system, data that is stored in the first physical block is triggered to be read and written into another physical block, and the data of the first physical block is migrated to the another physical block along with the GC process of the first logical block in the file system, to obtain continuous logical space in the first logical block and a clean first physical block. It can be learned that a logical block and a physical block can be simultaneously managed only by performing GC of the file system. GC of the storage system is not required, and fragmentation of storage space of the storage system caused by performing GC of the file system is further avoided.

Optionally, in this embodiment, the target data may be data written into the storage system for the first time, or data migrated from a second physical block of the storage system in a process of performing garbage collection GC of the file system.

When GC is performed on the target data, before step 202, the process includes: The first processor triggers a read request for the target data in the process of performing garbage collection GC of the file system. Before obtaining the target logical address, the second processor reads the target data from the second physical block in response to the read request for the target data.

In this possible embodiment, the target data is stored in the second physical block before being written into the first physical block, and a second logical block corresponds to the second physical block. The first processor performs GC of the file system. When performing GC on the target data, the first processor first allocates the target logical address to the target data from the first logical block, and then sends both an original logical address and the target logical address to the second processor. The second processor determines, based on the original logical address, that the target data of the second physical block needs to be migrated, determines a storage location of the target data in the first physical block based on the target logical address, and then migrates the target data to the first physical block. This can ensure that when the first processor performs GC on the second logical block, data of the second physical block may be migrated to the first physical block along with a process of migrating logical data of the second logical block to the first logical block. GC of the storage system is not required, and fragmentation of storage space of the storage system caused by performing GC of the file system is further avoided.

Optionally, step 203 includes: determining that the target logical address indicates a first logical page of the first logical block, applying for or allocating the first physical block, and establishing the correspondence between the first logical block and the first physical block. Step 204 includes:

writing the target data into the first physical page of the first physical block based on the correspondence.

In this embodiment of this application, the correspondence between the first logical block and the first physical block may be established when the second processor determines that the target logical address is a first logical address of the first logical block. Then, the second processor maintains the correspondence between the first logical block and the first physical block, and writes corresponding data into the first physical block when there is a logical address belonging to the first logical block subsequently. Because a flash memory chip has a feature of sequential writing, the second processor writes the target data into a first physical page. The correspondence between the first logical block and the first physical block is established only when the second processor determines that the target logical address is a first logical address of the first logical block. This can improve flexibility of a correspondence between a logical block and a physical block, and help improve flexibility of physical block management by the second processor.

Optionally, the data writing method provided in this embodiment of this application further includes: establishing a correspondence between a first logical segment of the first logical block and a first physical segment of the first physical block. The first logical segment includes at least two logical pages, the first physical segment includes at least two physical pages, and the target logical address indicates one logical page of the first logical segment. Correspondingly, the writing the target data into a first physical block includes: writing the target data into one physical page of the first physical segment based on the correspondence between the first logical segment and the first physical segment.

Figure 3C:
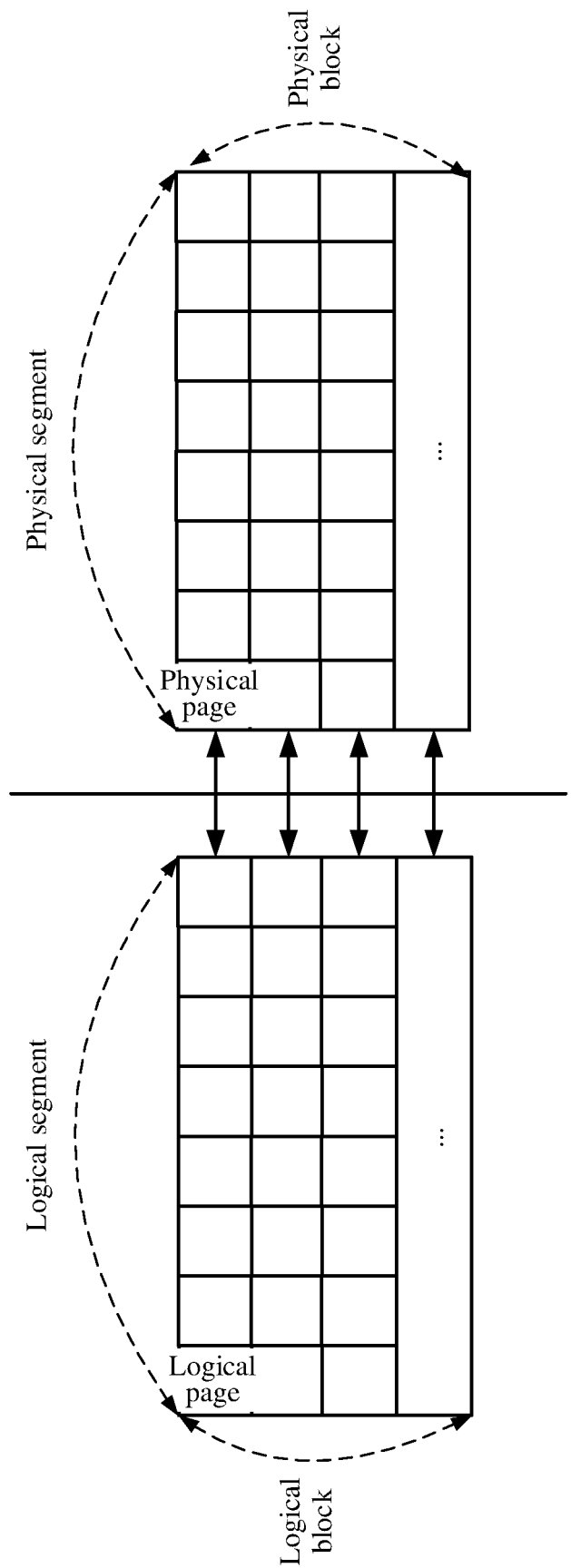
FIG. 3C is a schematic diagram of segment mapping between a logical block and a physical block according to an embodiment of this application.

Optionally, in this embodiment of this application, a concept of "segment (segment)" is further provided, and a length of a "segment" is between a length of a "block (block)" and a length of a "page (page)". A segment of a physical block is referred to as a physical segment (physical segment), and a segment of a logical block is referred to as a logical segment (logical segment). One physical block usually includes a plurality of physical segments, and one physical segment usually includes a plurality of physical pages. One logical block usually includes a plurality of logical segments, and one logical segment usually includes a plurality of logical pages. For a relationship between a "block", a "segment", and a "page" provided in this embodiment of this application, refer to an example in FIG. 3C. As shown in FIG. 3C, a logical block and a physical block are mapped by segment instead of by page. One logical segment is mapped to one physical segment, and a mapping table of segment mapping may be maintained by using a logical address of the logical segment and a physical address of the physical segment. The logical address of the logical segment may be represented by using a specific offset from the first logical address of the logical block. The physical address of the physical segment may be represented by using a specific offset from the first physical address of the physical block. Because a segment includes at least two pages, compared with the page mapping manner, the segment mapping manner can reduce a size of a mapping table, and facilitate fast data reading.

Based on division of three levels: "block", "segment", and "page", a data writing process in this embodiment of this application may include the following three solutions, which are separately described below.

1. The target logical address is the first logical address of the first logical block.

The first processor allocates the target logical address to the target data, and sends the target logical address to the second processor.

The second processor determines that the target logical address is the first logical address of the first logical block; allocates the first physical segment from the first physical block; establishes a mapping relationship between the first logical segment of the first logical block and the first physical segment, where the first physical segment includes at least two physical pages; and writes the target data into the first physical page of the first physical segment.

Figure 4A:
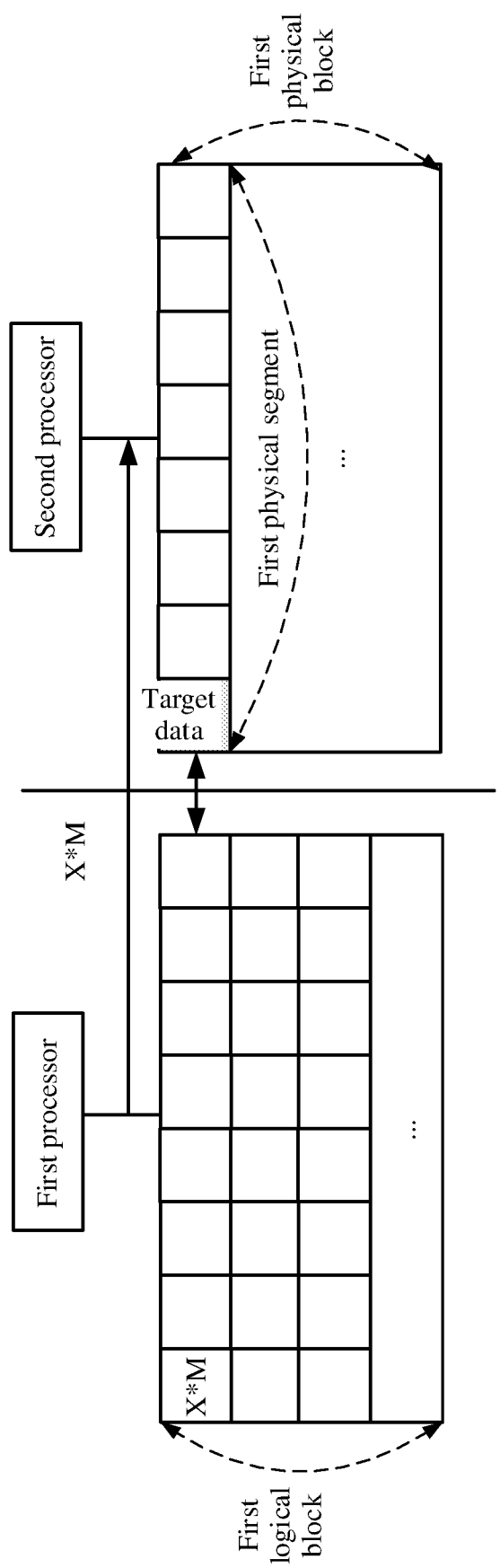
FIG. 4A is a schematic diagram of an example of a scenario of a data writing method according to an embodiment of this application.

For the process, refer to FIG. 4A. As shown in FIG. 4A, the target logical address allocated by the first processor to the target data is $X*M$. X indicates a block number of the first logical block, and M indicates that each logical block includes M logical pages. The first processor sends the target logical address $X*M$ to the second processor, where X is an integer greater than 0, and M is an integer greater than 1.

The second processor determines, based on $X*M$, that the target logical address is located at a first logical block whose block number is X, and the target logical address is the first logical address of the first logical block. Then, the second processor allocates the first physical block to the first logical block, and establishes the correspondence between the first logical block and the first physical block. In addition, the second processor allocates the first physical segment from the first physical block; establishes the correspondence between the first logical segment of the first logical block and the first physical segment; and writes the target data into the first physical page of the first physical segment.

2. The target logical address is a first logical address of the second logical segment of the first logical block.

The first processor allocates the target logical address to the target data, and sends the target logical address to the second processor.

The second processor determines that the target logical address is the first logical address of the second logical segment; allocates a second physical segment to the second logical segment; establishes a mapping relationship between the second logical segment and the second physical segment, where the second physical segment is the last of the at least two physical segments allocated from the first physical block, the second physical segment includes at least two physical pages, and the second logical segment is located at the first logical block; and writes the target data into the first physical page of the second physical segment.

Figure 4B:
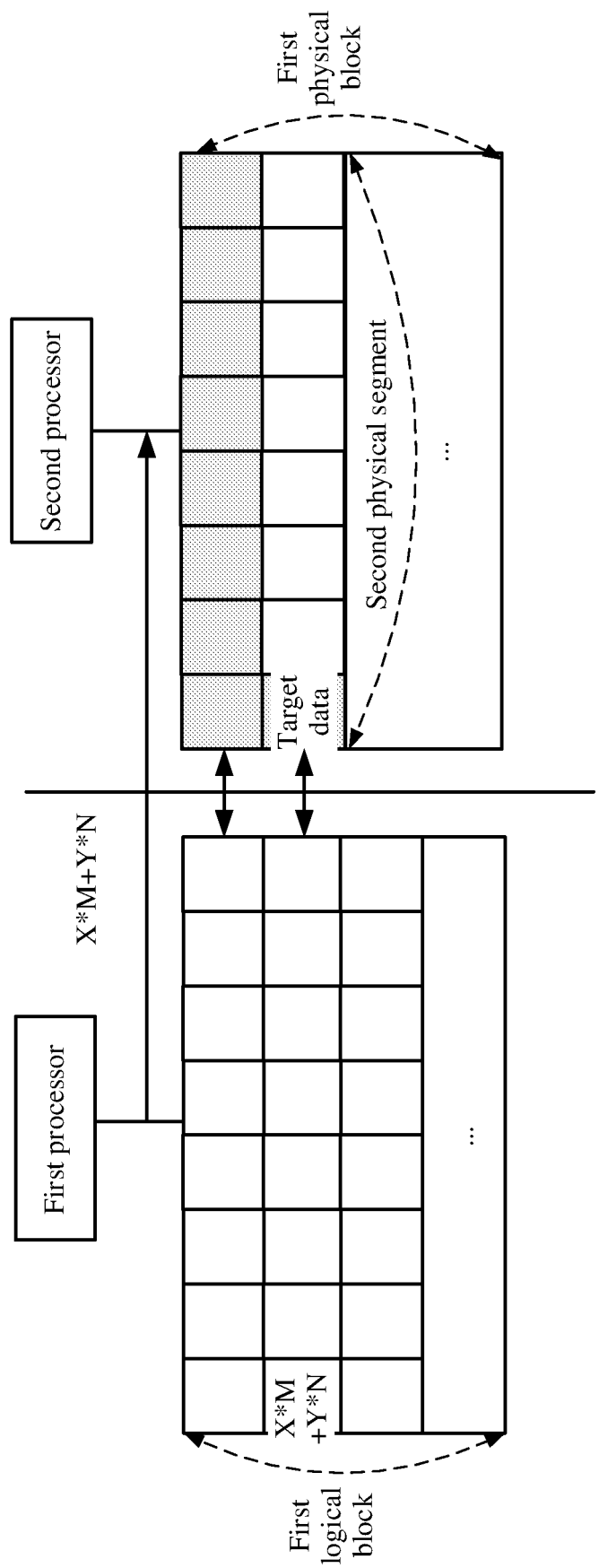
FIG. 4B is a schematic diagram of an example of another scenario of a data writing method according to an embodiment of this application.

For the process, refer to FIG. 4B. As shown in FIG. 4B, the target logical address allocated by the first processor to the target data is $X*M+Y*N$. X indicates a block number of the first logical block, M indicates that each logical block includes M logical pages, Y indicates a segment number of the second logical segment on the first logical block, and N indicates that each logical block includes N logical pages. The first processor sends the target logical address $X*M+Y*N$ to the second processor, where $M>N$.

The second processor determines, based on $X*M+Y*N$, that the target logical address is located at a first logical block whose block number is X, and at a second logical segment whose segment number is Y, and the target logical address is a first logical address of the second logical segment. Then, the second processor allocates the second physical segment to the second logical segment, establishes the mapping relationship between the second logical segment and the second physical segment, and writes the target data into the first physical page of the second physical segment.

3. The target logical address is located at a third logical segment of the first logical block, and is not a first logical address of the third logical segment.

The first processor allocates the target logical address to the target data, and sends the target logical address to the second processor.

The second processor determines that the target logical address is located at the third logical segment, and is not the first logical address; determines, based on a mapping relationship between the third logical segment and a third physical segment, and an offset of the target logical address in the third logical segment, a target physical page corresponding to the offset in the third physical segment, where the third physical segment includes at least two physical pages; and writes the target data into the target physical page of the third physical segment.

Figure 4C:
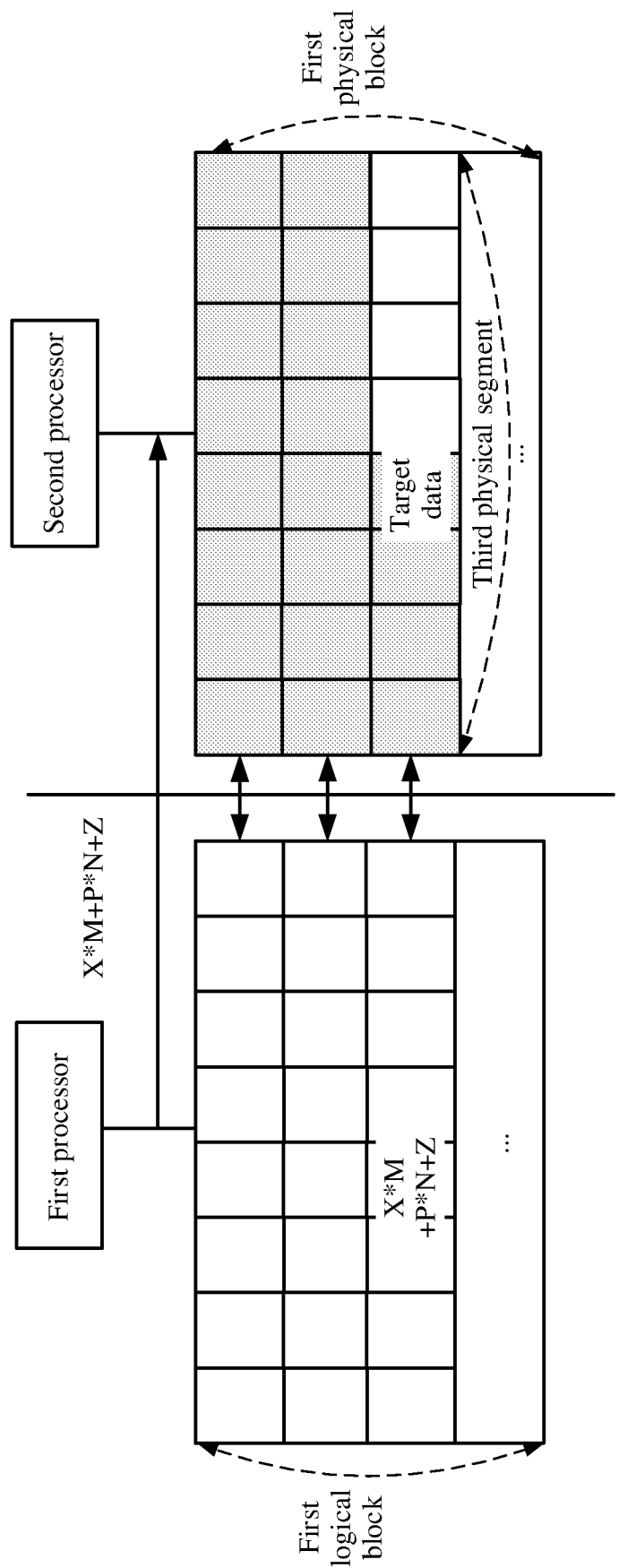
FIG. 4C is a schematic diagram of an example of another scenario of a data writing method according to an embodiment of this application.

For the process, refer to FIG. 4C. As shown in FIG. 4C, the target logical address allocated by the first processor to the target data is X*M+P*N+Z. X indicates a block number of the first logical block, M indicates that each logical block includes M logical pages, P indicates a segment number of the third logical segment on the first logical block, N indicates that each logical block includes N logical pages, and Z indicates an offset of a segment. The first processor sends the target logical address X*M+P*N+Z to the second processor, where M>N.

The second processor determines, based on X*M+P*N+Z, that the target logical address is located at a first logical block whose block number is X, and at a third logical segment whose segment number is Y, where a mapping relationship exists between the third logical segment and the third physical segment; determines the third physical segment based on the existing mapping relationship, and finds a target physical page in the third physical segment based on the offset Z of the segment; and writes the target data into the target physical page.

It should be noted that the first logical segment, the second logical segment, and the third logical segment may alternatively be a same logical segment, and the first physical segment, the second physical segment, and the third physical segment may alternatively be a same physical segment. Herein, different names are used to represent different scenarios.

The three solutions describe processes in which data writing is implemented through segment mapping in different scenarios. Regardless of which scenario, compared with the page mapping manner, the segment mapping manner can reduce a size of a mapping table, and facilitate fast data reading.

The solutions of this application may be applied to writing data after the data is migrated during GC of a file system. For ease of understanding the process, the following provides descriptions with reference to a schematic diagram before data migration shown in FIG. 5A and a schematic diagram after data migration shown in FIG. 5B.

Figure 5A:
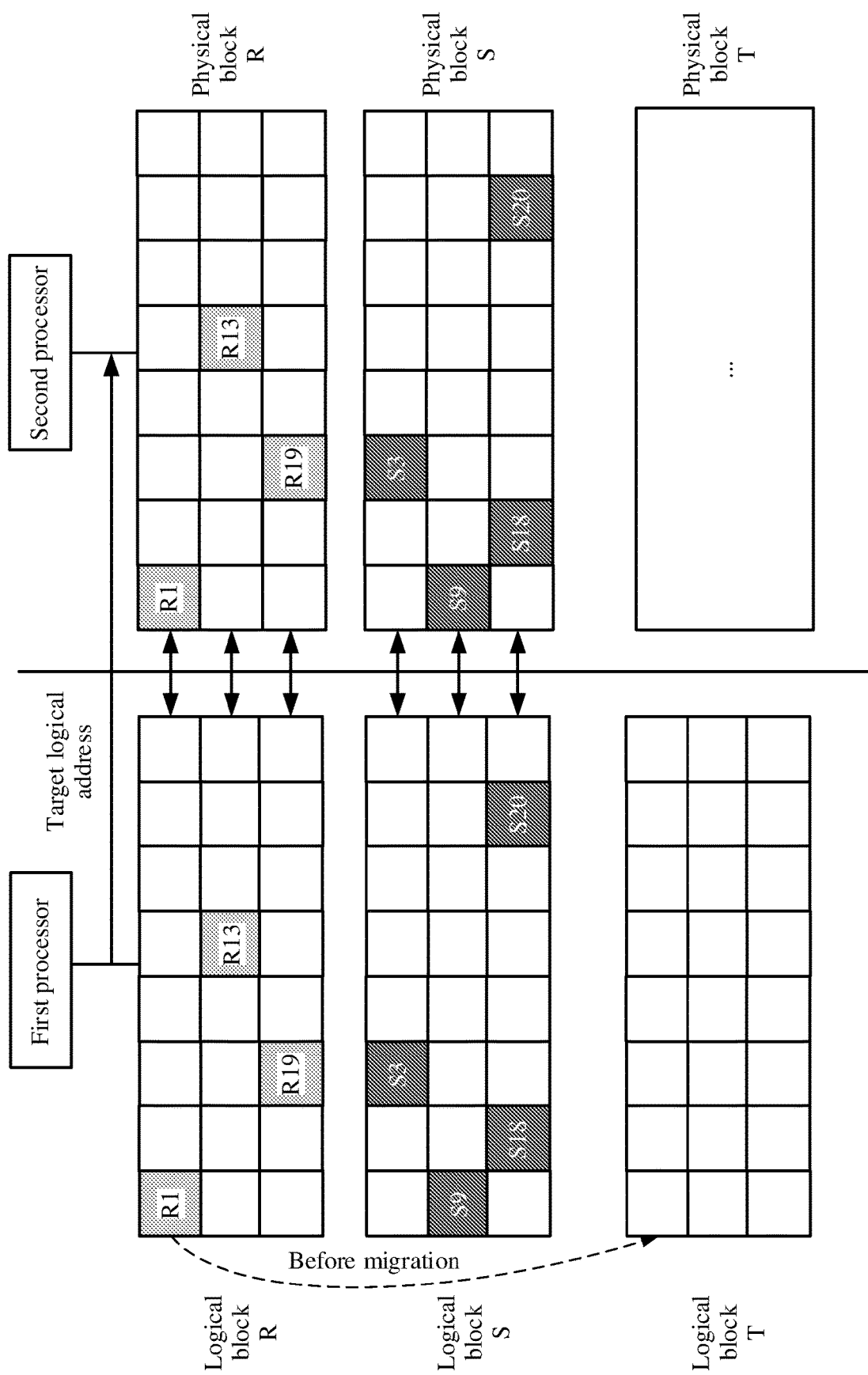
FIG. 5A is a schematic diagram of an example of a data writing method in a garbage collection process according to an embodiment of this application.

As shown in FIG. 5A, when performing GC of the file system, the first processor detects that after invalid data is cleared from a logical block R and a logical block S, less valid data is remained. The logical block R corresponds to a physical block R, and the logical block S corresponds to a physical block S. The first processor determines to migrate the remaining valid data of the logical block R and the logical block S to a logical block T. It should be noted that data of the logical block R and the logical block S is logical data.

Figure 5B:
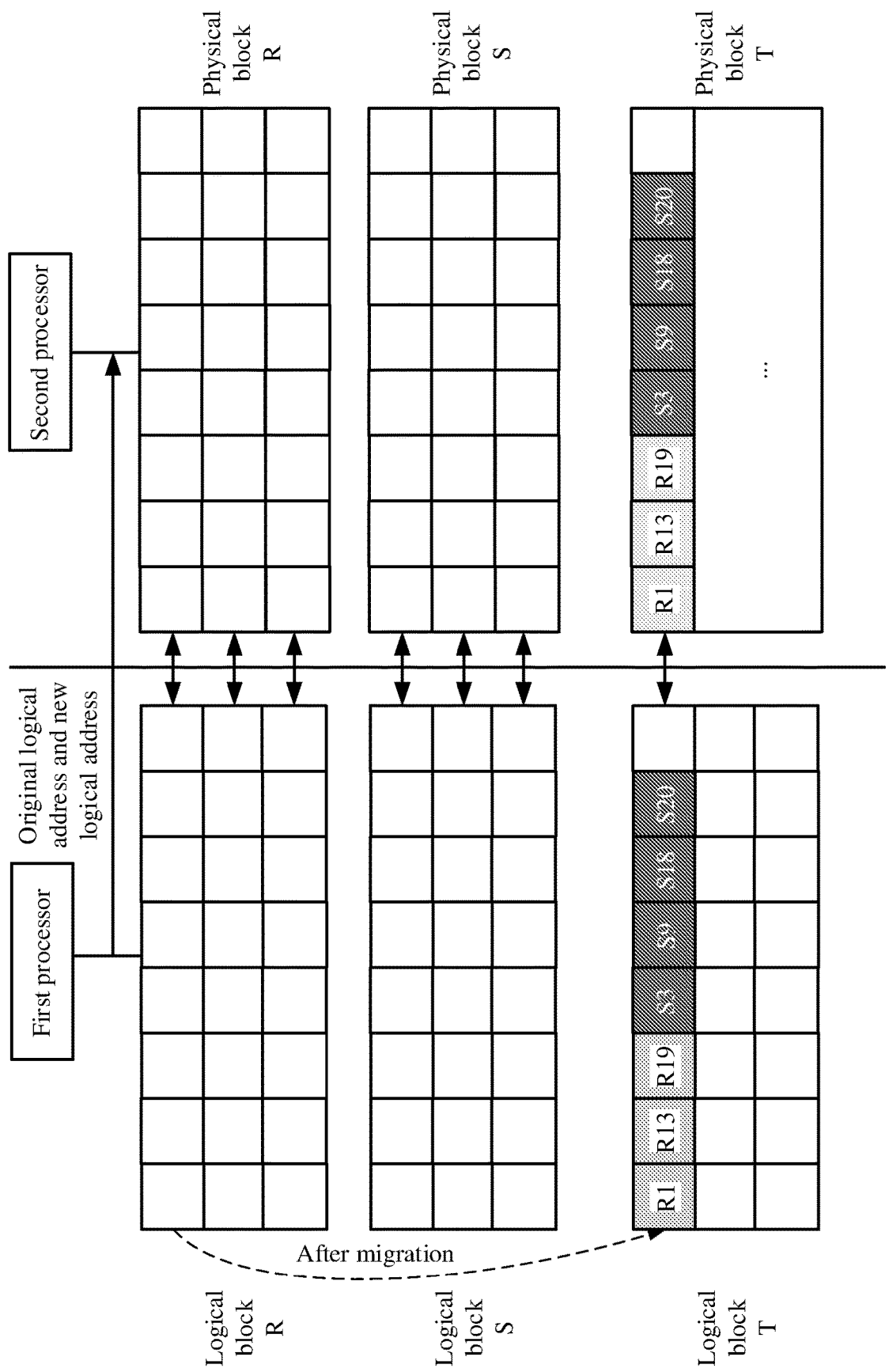
FIG. 5B is a schematic diagram of another example of a data writing method in a garbage collection process according to an embodiment of this application.

As shown in FIG. 5B, the first processor migrates data of logical blocks one by one. Usually, the first processor migrates remaining valid data in one logical block in sequence. The following describes a data migration process by using an example of migrating logical data R1 of a logical block.

The first processor determines that an original logical address of the logical data R1 is R*M; allocates a new logical address T*M of the logical block T to the logical data R1; sends the original logical address R*M and the new logical address T*M to the second processor; and then migrates the logical data R1 from the logical block R to a first logical page of a first logical segment of the logical block T.

The second processor determines, based on the original logical address R*M, to migrate physical data R1 of a physical block R; allocates a new physical block to the logical block T based on the new logical address T*M, for example, allocating a physical block T; establishes a correspondence between the physical block T and the logical block T; allocates the first physical segment from the physical block T, and establishes a mapping relationship between the first physical segment and the first logical segment of the logical block T; and migrates the physical data R1 from the physical block R to a first physical page of a first physical segment of the physical block T.

A process of migrating the logical data R1 is similar to the data writing solution in the scenario in FIG. 4A. In other logical data R13, R19, S3, S9, S18, and S20, for a migration process of the logical data S9, refer to the data writing solution in the scenario in FIG. 4B. For migration processes of the logical data R13, R19, S3, S18, and S20, refer to the data writing solution in the scenario in FIG. 4C. A migration process of each piece of logical data and corresponding physical data is not described herein again, and may be understood based on a location of to-be-migrated logical data in a logical block, and the migration process of the logical data R1, and with reference to FIG. 4B and FIG. 4C.

It can be learned from the computer system described in FIG. 1 that the file system may further include the key data identification file and the flash mode control file. The first processor may identify, by running the key data identification file, the target data to be written into the storage system, and determine whether the target data is key data. The first processor runs the flash mode control file, to control a mode of the flash memory chip. The mode of the flash memory chip may include a single-level cell (single-level cell, SLC), a multi-level cell (multi-level cell, MLC), a triple-level cell (triple-level cell, TLC), or a quadrilateral-level cell (quadrilateral-level cell, QLC).

In the data writing process, the first processor may select a first logical block in an appropriate mode based on an attribute of the target data. The process may include a case in which a logical block currently being allocated has remaining space, and a case in which a new logical block needs to be allocated.

Figure 6A:
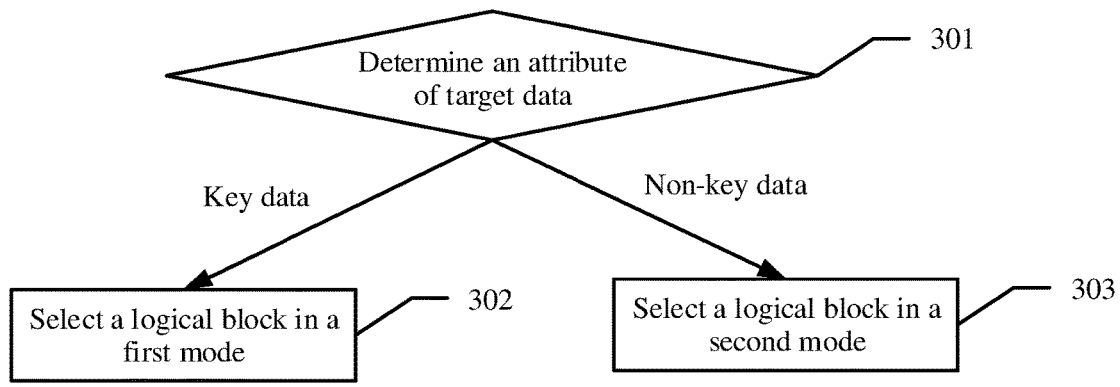
FIG. 6A is a schematic diagram of an embodiment of mode selection in a data writing process according to an embodiment of this application.

For the case in which a logical block currently being allocated has remaining space, refer to FIG. 6A. As shown in FIG. 6A, the process may include the following steps.

301: The first processor determines an attribute of the target data.

An attribute of data may be preset, and may be classified into key and common. Key data may include, for example, data of an application frequently used by a user and a key library file. All data other than key data may be classified into non-key data or common data.

302: If the target data is key data, select a logical block in a first mode.

303: If the target data is non-key data, select a logical block in a second mode.

Because a correspondence is established between a logical block and a physical block, a physical block corresponding to the logical block in the first mode is also in the first mode, and a physical block corresponding to the logical block in the second mode is also in the second mode.

For the first physical block, when the first physical block is set to the first mode, some storage space is disabled. Therefore, when no data is written into the first physical block, available space of the first physical block in the first mode is less than available space of the first physical block in the second mode. In addition, a speed of reading data from the first physical block in the first mode is greater than a speed of reading data from the first physical block in the second mode.

The first mode may be an SLC, and the second mode may be an MLC, a triple-level cell TLC, or a quadrilateral-level cell QLC. Alternatively, the first mode may be an MLC, and the second mode may be a TLC or a QLC, or the first mode may be a TLC, and the second mode may be a QLC.

Figure 6B:
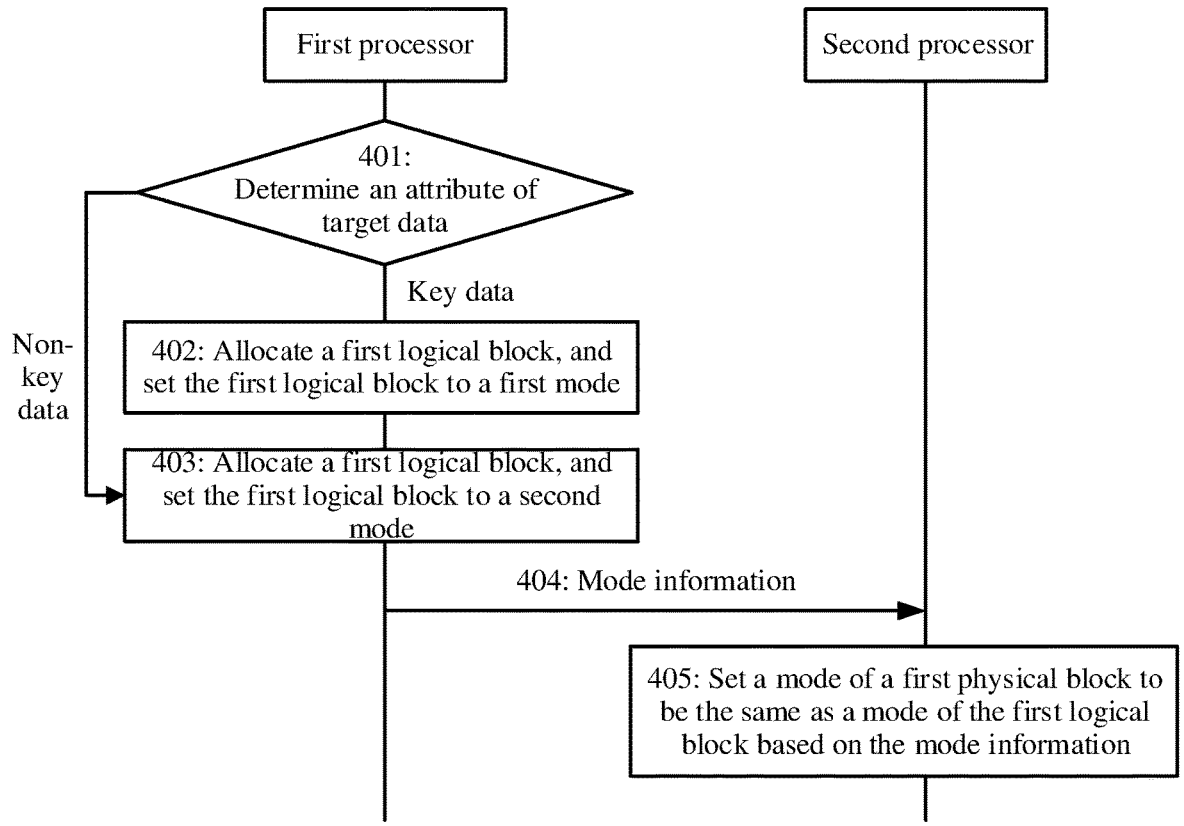
FIG. 6B is a schematic diagram of another embodiment of mode selection in a data writing process according to an embodiment of this application.

For the case in which a new logical block needs to be allocated, refer to FIG. 6B. As shown in FIG. 6B, the process may include the following steps.

401: The first processor determines an attribute of the target data.

402: If the target data is key data, the first processor allocates the first logical block, and sets the first logical block to a first mode.

403: If the target data is non-key data, the first processor allocates the first logical block, and sets the first logical block to a second mode.

404: The first processor sends mode information to the second processor.

The mode information indicates the second processor to set a mode of the first physical block to be the same as a mode of the first logical block.

405: The second processor sets a mode of the first physical block to be the same as a mode of the first logical block based on the mode information.

According to the solution provided in this embodiment of this application, the key data is written into the physical block in the first mode. This can improve a reading speed of the key data, and further improve smoothness of an application frequently used by a user.

Figure 6C:
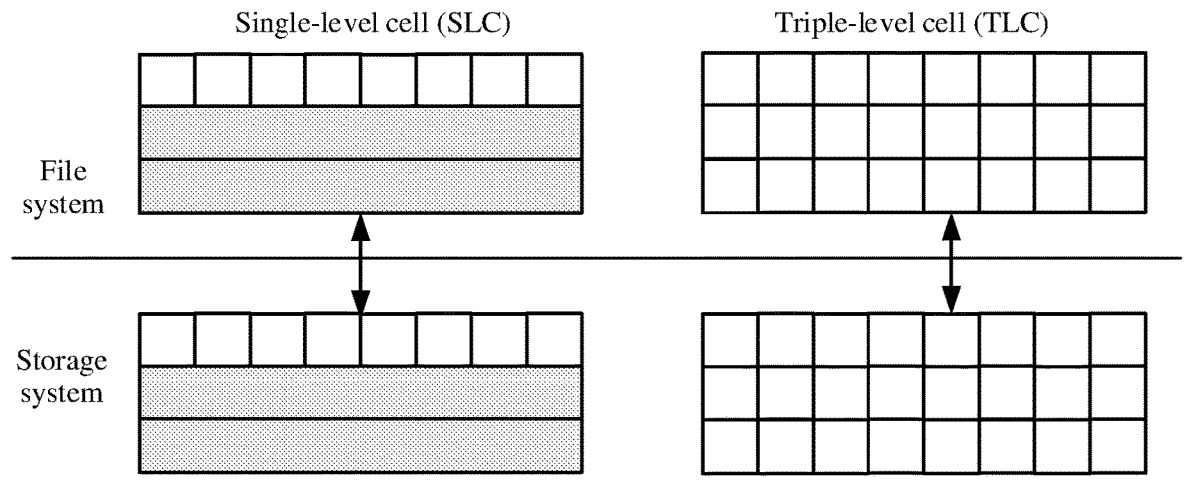
FIG. 6C is a schematic diagram of an example of a mode according to an embodiment of this application.

In FIG. 6C, the following describes the first mode and the second mode by using an example in which the first mode is an SLC and the second mode is a TLC. As shown in FIG. 6C, in comparison with a logical block in a TLC, when a logical block is in an SLC, there is ⅓ available space, and a corresponding physical block also has ⅓ available space. When the logical block is in the TLC mode, space usage of the logical block and the physical block is three times bigger than space usage when the logical block is in the SLC mode. A speed of reading data from the physical block in the SLC mode is greater than a speed of reading data from the physical block in the TLC mode.

Optionally, another embodiment of the data writing method provided in embodiments of this application further includes: if total available storage space of the storage system meets a preset requirement, and the second processor detects the key data in the physical block in the second mode, migrating the key data in the physical block in the second mode to the physical block in the first mode.

In this embodiment of this application, when remaining storage space is small, the key data may be temporarily written into the physical block in the second mode. After a period of time, the user may clear some historical data, or some invalid data is deleted during GC, and there is sufficient storage space, for example, the storage space exceeds a preset threshold. Whether the physical block in the second mode stores the key data may be detected. If the key data is stored in the physical block in the second mode, the key data may be migrated to the physical block in the first mode in time. This can improve a reading speed of the key data.

The foregoing embodiments describe the data writing solution, implemented through interaction between the first processor and the second processor, provided in embodiments of this application. The following describes a data writing solution, independently completed by the first processor, provided in embodiments of this application.

2. A data writing solution provided in embodiments of this application is independently completed by the first processor.

Figure 7:
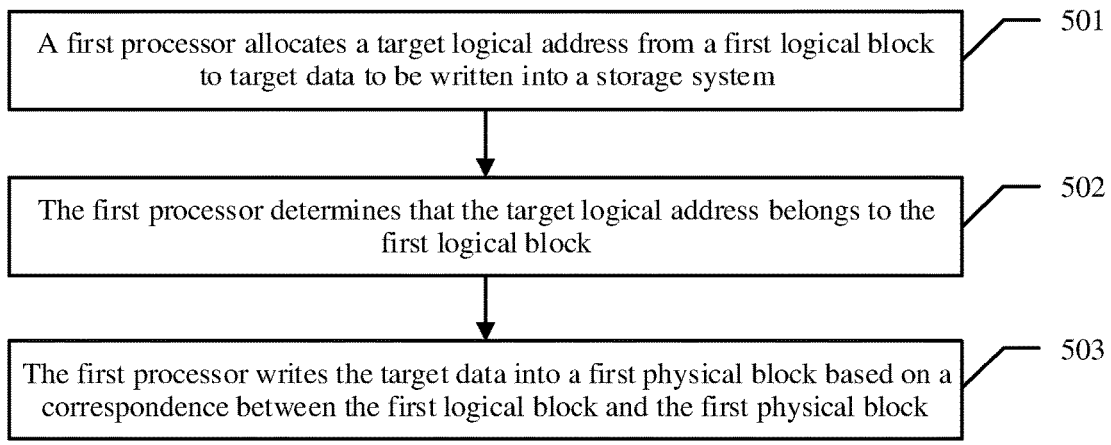
FIG. 7 is a schematic diagram of another embodiment of a data writing method according to an embodiment of this application.

As shown in FIG. 7, an embodiment of a data writing method according to an embodiment of this application includes the following steps.

501: A first processor allocates a target logical address from a first logical block to target data to be written into the storage system.

The first logical block is one of a plurality of logical blocks included in a file system.

502: The first processor determines that the target logical address belongs to the first logical block.

503: The first processor writes the target data into a first physical block based on a correspondence between the first logical block and the first physical block.

The first physical block is one of a plurality of physical blocks.

Optionally, according to the data writing method provided in embodiments of this application, before the allocating a target logical address from a first logical block to target data to be written into the storage system, the method further includes: reading the target data from a second physical block in response to a read request for the target data, where the read operation is triggered by a garbage collection GC process of the file system.

It should be noted that the data writing process independently completed by the first processor is basically the same as the process completed by interaction between the first processor and the second processor, except that an action executed by the second processor in the interaction solution is also executed by the first processor. The first processor does not need to send the target logical address, the mode information, or the like to the second processor. For the data writing process independently completed by the first processor, refer to related content in the foregoing descriptions. Details are not described herein again.

The foregoing describes the architecture of the computer system and the data writing method. The following describes a data writing apparatus in embodiments of this application with reference to accompanying drawings.

Figure 8:
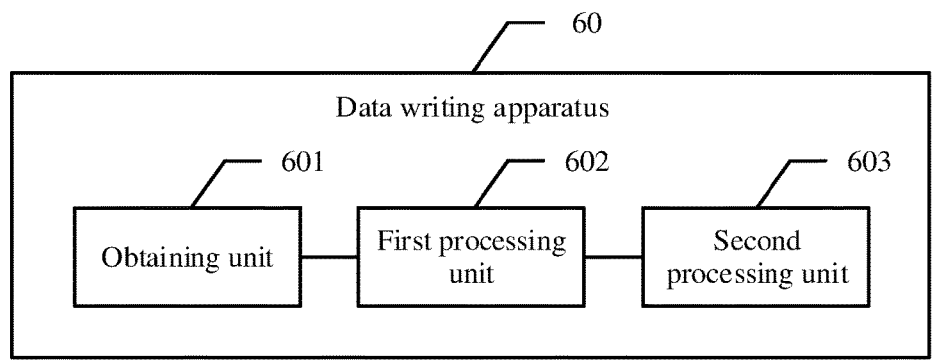
FIG. 8 is a schematic diagram of an embodiment of a data writing apparatus according to an embodiment of this application.

FIG. 8 is a schematic diagram of an embodiment of a data writing apparatus 60 according to an embodiment of this application.

As shown in FIG. 8, the data writing apparatus 60 provided in this embodiment of this application is applied to a computer system. The computer system includes a file system and a flash memory-based storage system. The apparatus 60 includes:

an obtaining unit 601, configured to obtain a target logical address, where the target logical address is an address allocated from a first logical block to target data to be written into the storage system, the first logical block is one of a plurality of logical blocks included in the file system, and the storage system includes a plurality of physical blocks;

a first processing unit 602, configured to determine that the target logical address belongs to the first logical block; and a second processing unit 603, configured to write the target data into a first physical block based on a correspondence between the first logical block and the first physical block, where the first physical block is one of the plurality of physical blocks.

According to the solution provided in embodiments of this application, when data is written, the target logical address is allocated from the first logical block, and the target data is written into the first physical block based on the correspondence between the first logical block and the first physical block. In this way, when GC is performed on the first logical block, data that is stored in the first physical block is triggered to be read and written into another physical block, and the data of the first physical block is migrated to the another physical block along with the GC process of the first logical block, to obtain continuous logical space in the first logical block and a clean first physical block. It can be learned that, according to the solution provided in this application, a logical block and a physical block can be simultaneously managed only by performing GC of the file system. GC of the storage system is not required, and fragmentation of storage space of the storage system caused by performing GC of the file system is further avoided.

Optionally, before the target logical address is obtained, the second processing unit 603 is further configured to read the target data from a second physical block in response to a read request, of the obtaining unit 601, for the target data, where the read operation is triggered by a garbage collection GC process of the file system.

Optionally, the first processing unit 602 is further configured to: determine that the target logical address indicates a first logical page of the first logical block, apply for or allocate the first physical block, and establish the correspondence between the first logical block and the first physical block.

The second processing unit 603 is configured to write the target data into the first physical page of the first physical block based on the correspondence.

Optionally, the first processing unit 602 is further configured to establish a correspondence between a first logical segment of the first logical block and a first physical segment of the first physical block. The first logical segment includes at least two logical pages, the first physical segment includes at least two physical pages, and the target logical address indicates one logical page of the first logical segment.

The second processing unit 603 is configured to write the target data into one physical page of the first physical segment based on the correspondence between the first logical segment and the first physical segment.

Optionally, the second processing unit 603 is configured to determine, based on an offset of the target logical address in the first logical segment, a target physical page corresponding to the offset in the first physical segment, and write the target data into the target physical page.

Optionally, the obtaining unit 601 is configured to: obtain mode information, where the mode information is determined based on an attribute of the target data, and if the attribute indicates that the target data is key data, the mode information indicates that the first logical block is in a first mode, or if the attribute indicates that the target data is non-key data, the mode information indicates that the first logical block is in a second mode; and set a mode of the first physical block to be the same as a mode of the first logical block based on the mode information, where a speed of reading data from the first physical block in the first mode is greater than a speed of reading data from the first physical block in the second mode.

Optionally, the first processing unit 602 is further configured to: if total available storage space of the storage system meets a preset requirement, and the key data is detected in the physical block in the second mode, migrate the key data in the physical block in the second mode to the physical block in the first mode.

The obtaining unit 601, the first processing unit 602, and the second processing unit 603 may be implemented by using one unit, or may be implemented by using two or three units.

Optionally, the first mode is a single-level unit SLC, and the second mode is a triple-level cell TLC or a quadrilateral-level cell QLC.

For the data writing apparatus, refer to related content in the method embodiments. Details are not described herein again.

Figure 9:
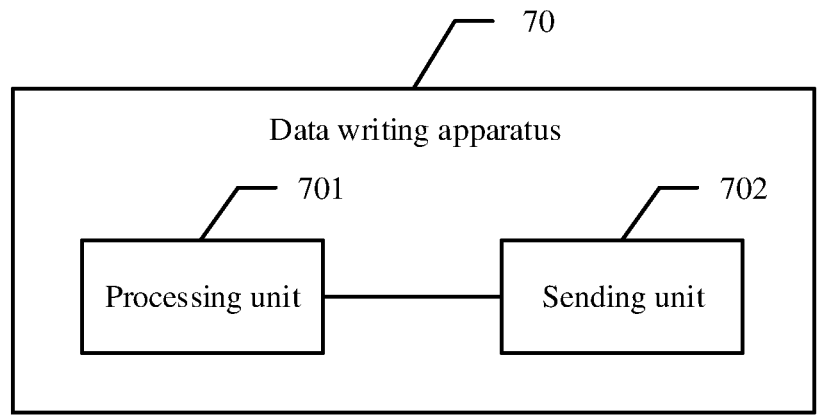
FIG. 9 is a schematic diagram of another embodiment of a data writing apparatus according to an embodiment of this application.

FIG. 9 is a schematic diagram of an embodiment of a data writing apparatus 70 according to an embodiment of this application.

As shown in FIG. 9, the data writing apparatus 70 provided in this embodiment of this application is applied to a computer system. The computer system includes a file system, a flash memory-based storage system, and the data writing apparatus. The storage system includes a second processor. The apparatus 70 includes:

a processing unit 701, configured to allocate a target logical address from a first logical block to target data to be written into the storage system, where the first logical block is one of a plurality of logical blocks included in the file system, and the storage system includes a plurality of physical blocks; and a sending unit 702, configured to: send the target logical address to the second processor, where the target logical address is used by the second processor to determine that the target logical address belongs to the first logical block; and write the target data into a first physical block based on a correspondence between the first logical block and the first physical block, where the first physical block is one of the plurality of physical blocks.

According to the solution provided in embodiments of this application, when data is written, the target logical address is allocated from the first logical block, and the target data is written into the first physical block based on the correspondence between the first logical block and the first physical block. In this way, when GC is performed on the first logical block, data that is stored in the first physical block is triggered to be read and written into another physical block, and the data of the first physical block is migrated to the another physical block along with the GC process of the first logical block, to obtain continuous logical space in the first logical block and a clean first physical block. It can be learned that, according to the solution provided in this application, a logical block and a physical block can be simultaneously managed only by performing GC of the file system. GC of the storage system is not required, and fragmentation of storage space of the storage system caused by performing GC of the file system is further avoided.

Optionally, before the target logical address is sent, the processing unit 701 is further configured to trigger a read request for the target data in a process in which the second processor performs garbage collection GC of the file system. The read request is used by the second processor to read the target data from a second physical block.

Optionally, the processing unit 701 is further configured to determine an attribute of the target data. The first logical block is selected based on the attribute. If the attribute indicates that the target data is key data, the first logical block is in a first mode, or if the attribute indicates that the target data is non-key data, the first logical erase block is in a second mode. Correspondingly, a mode of the first physical block is the same as a mode of the first logical block, and a speed of reading data from the first physical block in the first mode is greater than a speed of reading data from the first physical block in the second mode.

Optionally, the processing unit 701 is further configured to: if the target logical address is the first logical address of the first logical block, set the mode of the first logical block based on the attribute of the target data.

The sending unit is further configured to send mode information of the first logical block to the second processor, where the mode information indicates the second processor to set the mode of the first physical block to be the same as the mode of the first logical block.

Optionally, the processing unit 701 is configured to: if the attribute indicates that the target data is key data, set the mode of the first logical block to the first mode; or if the attribute indicates that the target data is non-key data, set the mode of the first logical block to the second mode.

Figure 10:
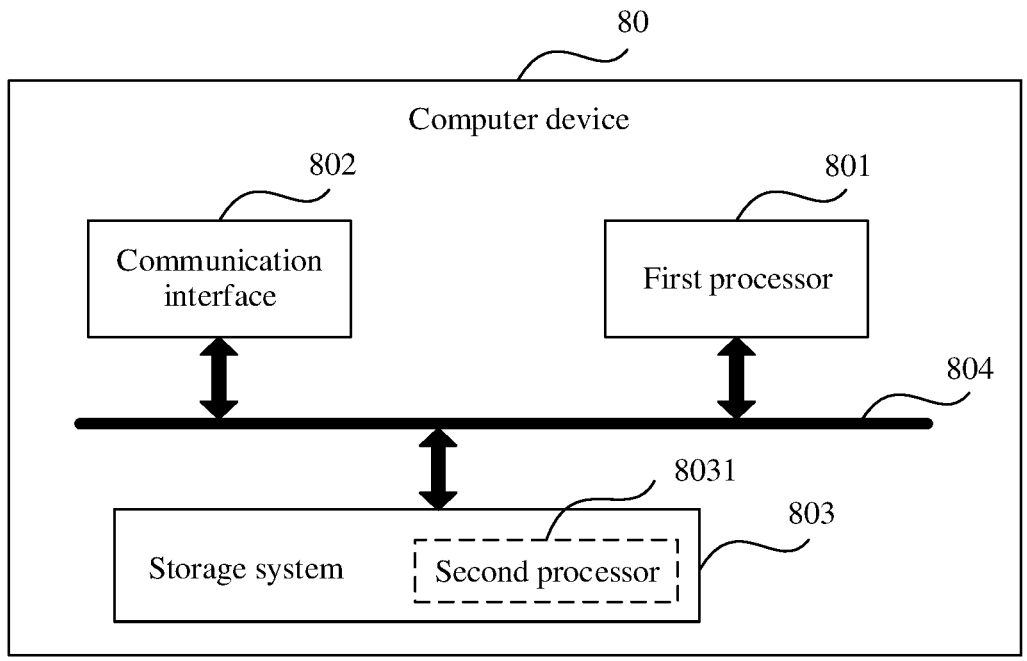
FIG. 10 is a schematic diagram of an embodiment of a computer device according to an embodiment of this application.

FIG. 10 is a schematic diagram of a possible logical structure of a computer device 80 according to an embodiment of this application. The computer device 80 includes a first processor 801, a communication interface 802, a storage system 803, and a bus 804. The first processor 801, the communication interface 802, and the storage system 803 are connected to each other by using the bus 804. The storage system 803 may include a second processor 8031. In this embodiment of this application, the first processor 801 is configured to control and manage an action of the computer device 80. For example, the first processor 801 is configured to perform steps performed by the first processor in the method embodiments in FIG. 1 to FIG. 6C. The second processor 8031 is configured to perform steps performed by the second processor in the method embodiments in FIG. 1 to FIG. 6C. The communication interface 802 is configured to support the computer device 80 in communication. The storage system 803 is configured to store program code and data of the computer device 80.

The first processor 801 or the second processor 8031 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the first processor 801 or the second processor 8031 may be a combination of processors implementing a computing function, for example, a combination of one or more microprocessors, or a combination of a digital signal processor and a microprocessor. The bus 804 may be a peripheral component interconnect (peripheral component interconnect, PCI) bus, an extended industry standard architecture (extended industry standard architecture, EISA) bus, or the like. The bus may be classified into an address bus, a data bus, a control bus, or the like. For ease of indication, the bus is indicated by using only one bold line in FIG. 10. However, it does not indicate that there is only one bus or only one type of bus.

Alternatively, the storage system 803 may not include the second processor 8031. If the storage system 803 does not include the second processor 8031, the first processor 801 is configured to perform the steps performed by the first processor in the method embodiment in FIG. 7.

In another embodiment of this application, a computer-readable storage medium is further provided. The computer-readable storage medium stores computer-executable instructions. When a first processor of a device executes the computer-executable instructions, the device performs the steps of the data writing method performed by the first processor in FIG. 1 to FIG. 6C. When a second processor of the device executes the computer-executable instructions, the device performs the steps of the data writing method performed by the second processor in FIG. 1 to FIG. 6C.

In another embodiment of this application, a computer-readable storage medium is further provided. The computer-readable storage medium stores computer-executable instructions. When a first processor of a device executes the computer-executable instructions, the device performs the steps of the data writing method performed by the first processor in FIG. 7.

In another embodiment of this application, a computer program product is further provided. The computer program product includes computer-executable instructions, and the computer-executable instructions are stored in a computer-readable storage medium. When a first processor of a device executes the computer-executable instructions, the device performs the steps of the data writing method performed by the first processor in FIG. 1 to FIG. 6C. When a second processor of the device executes the computer-executable instructions, the device performs the steps of the data writing method performed by the second processor in FIG. 1 to FIG. 6C.

In another embodiment of this application, a computer program product is further provided. The computer program product includes computer-executable instructions, and the computer-executable instructions are stored in a computer-readable storage medium. When a first processor of a device executes the computer-executable instructions, the device performs the steps of the data writing method performed by the first processor in FIG. 7.

In another embodiment of this application, a chip system is further provided. The chip system includes a first processor and a second processor. The first processor is configured to support a data writing apparatus in implementing the steps of the data writing method performed by the first processor in FIG. 1 to FIG. 6C. The second processor is configured to support the data writing apparatus in implementing the steps of the data writing method performed by the second processor in FIG. 1 to FIG. 6C. In a possible design, the chip system may further include a memory. The memory is configured to store program instructions and data that are necessary for the data writing apparatus. The chip system may include a chip, or may include a chip and another discrete device.

In another embodiment of this application, a chip system is further provided. The chip system includes a first processor and a second processor. The first processor is configured to support a data writing apparatus in implementing the steps of the data writing method performed by the first processor in FIG. 7.

A person of ordinary skill in the art may be aware that, with reference to the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of embodiments of this application.

A person skilled in the art may clearly understand that, for the purpose of convenient and brief description, for a detailed working process of the foregoing system, apparatus, and unit, refer to a corresponding process in the method embodiments. Details are not described herein again.

In the several embodiments provided in embodiments of this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device, or the like) to perform all or some of the steps of the methods described in the embodiments of this application. The foregoing storage medium includes various media that can store program code, such as a USB flash drive, a removable hard disk drive, a read-only memory (Read-Only Memory, ROM), a random access memory (Random Access Memory, RAM), a magnetic disk, and an optical disc.

What is claimed is:

1. A data writing method, wherein the data writing method is applied to a computer system that comprises a file system and a flash memory-based storage system, and the data writing method comprises:

obtaining a target logical address, wherein the target logical address is an address allocated from a first logical segment of a first logical block to target data to be written into the flash memory-based storage system, the first logical block is one of a plurality of logical blocks comprised in the file system, the first logical segment comprises at least two logical pages, and the flash memory-based storage system comprises a plurality of physical blocks;

determining that the target logical address belongs to the first logical segment of the first logical block; and writing the target data into a first physical segment of a first physical block based on a correspondence between the first logical block and the first physical block and a correspondence between the first logical segment of the first logical block and the first physical segment of the first physical block, wherein the first physical segment comprises at least two physical pages, the first logical block comprises at least two logical segments, the first physical block comprises at least two physical segments, a total number of logical segments of the first logical block is equal to a total number of physical segments of the first physical block, and the first physical block is one of the plurality of physical blocks.

2. The data writing method according to claim 1, wherein before the obtaining a target logical address, the data writing method further comprises:

reading the target data from a second physical block in response to a read request for the target data, wherein the read operation is triggered by a garbage collection (GC) process of the file system.

3. The data writing method according to claim 1, wherein:

the determining that the target logical address belongs to the first logical block comprises:

determining that the target logical address indicates a first logical page of the first logical block;

applying for or allocating the first physical block; and establishing the correspondence between the first logical block and the first physical block; and correspondingly, the writing the target data into a first physical segment of a first physical block based on a correspondence between the first logical block and the first physical block comprises:

writing the target data into a first physical page of the first physical block based on the correspondence between the first logical block and the first physical block.

4. The data writing method according to claim 1, wherein the target logical address indicates one logical page of the first logical segment; and correspondingly, the writing the target data into a first physical segment of a first physical block comprises:

writing the target data into one physical page of the first physical segment based on the correspondence between the first logical segment and the first physical segment.

5. The data writing method according to claim 4, wherein the writing the target data into one physical page of the first physical segment based on the correspondence between the first logical segment and the first physical segment comprises:

determining, based on an offset of the target logical address in the first logical segment, a target physical page corresponding to the offset in the first physical segment; and writing the target data into the target physical page.

6. The data writing method according to claim 1, wherein the data writing method further comprises:
   obtaining mode information, wherein the mode information is determined based on an attribute of the target data, and:
      if the attribute indicates that the target data is key data, the mode information indicates that the first logical block is in a first mode; or
      if the attribute indicates that the target data is non-key data, the mode information indicates that the first logical block is in a second mode; and
   setting a mode of the first physical block to be the same as a mode of the first logical block based on the mode information, wherein:
      a speed of reading data from the first physical block in the first mode is greater than a speed of reading data from the first physical block in the second mode.

7. The data writing method according to claim 6, wherein the data writing method further comprises:
   in response to determining that total available storage space of the flash memory-based storage system meets a preset requirement, and the key data is detected in a physical block in the second mode, migrating the key data in the physical block in the second mode to a physical block in the first mode.

8. The data writing method according to claim 6, wherein the first mode is a single-level cell (SLC), and the second mode is a triple-level cell (TLC) or a quadrilateral-level cell (QLC).

9. A data writing method, wherein the data writing method is applied to a computer system that comprises a file system, a flash memory-based storage system, and a first processor, the flash memory-based storage system comprises a second processor, and the data writing method comprises:
   allocating, by the first processor, a target logical address from a first logical segment of a first logical block to target data to be written into the flash memory-based storage system, wherein the first logical block is one of a plurality of logical blocks comprised in the file system, the first logical segment comprises at least two logical pages, and the flash memory-based storage system comprises a plurality of physical blocks;
   sending, by the first processor, the target logical address to the second processor, wherein the target logical address is used by the second processor to determine that the target logical address belongs to the first logical segment of the first logical block; and
   writing, by the second processor, the target data into a first physical segment of a first physical block based on a correspondence between the first logical block and the first physical block and a correspondence between the first logical segment of the first logical block and the first physical segment of the first physical block, wherein the first physical segment comprises at least two physical pages, the first logical block comprises at least two logical segments, the first physical block comprises at least two physical segments, a total number of logical segments of the first logical block is equal to a total number of physical segments of the first physical block, and the first physical block is one of the plurality of physical blocks.

10. The data writing method according to claim 9, wherein before the sending, by the first processor, the target logical address to the second processor, the data writing method further comprises:
   triggering, by the first processor, a read request for the target data in a process of performing garbage collection (GC) of the file system, wherein the read request is used by the second processor to read the target data from a second physical block.

11. The data writing method according to claim 9, wherein the data writing method further comprises:
   determining, by the first processor, an attribute of the target data; and
   determining, by the first processor, the first logical block based on the attribute, wherein:
      if the attribute indicates that the target data is key data, the first logical block is in a first mode; or
      if the attribute indicates that the target data is non-key data, the first logical block is in a second mode; and
   wherein:
      correspondingly, a mode of the first physical block is the same as a mode of the first logical block, and a speed of reading data from the first physical block in the first mode is greater than a speed of reading data from the first physical block in the second mode.

12. The data writing method according to claim 11, wherein the data writing method further comprises:
   in response to determining that the target logical address is a first logical address of the first logical block:
      setting, by the first processor, the mode of the first logical block based on the attribute of the target data; and
      sending, by the first processor, mode information of the first logical block to the second processor, wherein the mode information indicates the second processor to set the mode of the first physical block to be the same as the mode of the first logical block.

13. The data writing method according to claim 12, wherein the setting, by the first processor, the mode of the first logical block based on the attribute of the target data comprises:
   if the attribute indicates that the target data is key data, setting the mode of the first logical block to the first mode; or
   if the attribute indicates that the target data is non-key data, setting the mode of the first logical block to the second mode.

14. A computing device, comprising:
   at least one processor; and
   one or more memories coupled to the at least one processor and storing programming instructions for execution by the at least one processor to cause the computing device to perform operations comprising:
      obtaining a target logical address, wherein the target logical address is an address allocated from a first logical segment of a first logical block to target data to be written into a flash memory-based storage system of a computer system, the first logical block is one of a plurality of logical blocks comprised in a file system of the computer system, the first logical segment comprises at least two logical pages, and the flash memory-based storage system comprises a plurality of physical blocks;
      determining that the target logical address belongs to the first logical segment of the first logical block; and
      writing the target data into a first physical segment of a first physical block based on a correspondence between the first logical block and the first physical block and a correspondence between the first logical segment of the first logical block and the first physical segment of the first physical block, wherein the first physical segment comprises at least two physical pages, the first logical block comprises at least two logical segments, the first physical block comprises at least two physical segments, a total number of logical segments of the first logical block is equal to a total number of physical segments of the first physical block, and the first physical block is one of the plurality of physical blocks.

15. The computing device according to claim 14, wherein the operations further comprise:
before obtaining the target logical address, reading the target data from a second physical block in response to a read request for the target data, wherein the read operation is triggered by a garbage collection (GC) process of the file system.

16. The computing device according to claim 14, wherein the target logical address indicates one logical page of the first logical segment; and writing the target data into the first physical segment of the first physical block comprises:
writing the target data into one physical page of the first physical segment based on the correspondence between the first logical segment and the first physical segment.

17. The computing device according to claim 16, wherein the writing the target data into one physical page of the first physical segment based on the correspondence between the first logical segment and the first physical segment comprises:
determining, based on an offset of the target logical address in the first logical segment, a target physical page corresponding to the offset in the first physical segment; and
writing the target data into the target physical page.

18. The computing device according to claim 14, wherein the operations further comprise:
obtaining mode information, wherein the mode information is determined based on an attribute of the target data, and:
if the attribute indicates that the target data is key data, the mode information indicates that the first logical block is in a first mode; or
if the attribute indicates that the target data is non-key data, the mode information indicates that the first logical block is in a second mode; and
setting a mode of the first physical block to be the same as a mode of the first logical block based on the mode information, wherein a speed of reading data from the first physical block in the first mode is greater than a speed of reading data from the first physical block in the second mode.

19. The computing device according to claim 18, wherein the operations further comprise:
migrating the key data in a physical block in the second mode to a physical block in the first mode in response to determining that total available storage space of the flash memory-based storage system meets a preset requirement and the key data is detected in the physical block in the second mode.

20. The computing device according to claim 18, wherein the first mode is a single-level cell (SLC), and the second mode is a triple-level cell (TLC) or a quadrilateral-level cell (QLC).

* * * * *